(12) United States Patent
Pittel et al.

(10) Patent No.: US 10,100,942 B2
(45) Date of Patent: Oct. 16, 2018

(54) INLET SUPPORT STRUCTURE FOR A TENSION ACTING RUPTURE DISC

(71) Applicant: Continental Disc Corporation, Liberty, MO (US)

(72) Inventors: Brian Francis Pittel, Overland Park, KS (US); J. Kyle McCamis, Excelsior Springs, MO (US)

(73) Assignee: Continental Disc Corporation, Liberty, MO (US)

( * ) Notice: Subject to any disclaimer, the term of this patent is extended or adjusted under 35 U.S.C. 154(b) by 20 days.

(21) Appl. No.: 15/241,249

(22) Filed: Aug. 19, 2016

(65) Prior Publication Data

US 2018/0051819 A1 Feb. 22, 2018

(51) Int. Cl.
  *F16K 17/16* (2006.01)
  *F16K 17/40* (2006.01)

(52) U.S. Cl.
  CPC ............ *F16K 17/162* (2013.01); *F16K 17/16* (2013.01); *F16K 17/40* (2013.01); *F16K 17/1626* (2013.01); *Y10T 137/1692* (2015.04); *Y10T 137/1729* (2015.04)

(58) Field of Classification Search
  CPC .... F16K 17/16; F16K 17/162; F16K 17/1626; F16K 17/1633; F16K 17/40; F16K 17/403; Y10T 137/1692; Y10T 137/1699; Y10T 167/1714; Y10T 137/1729; Y10T 137/1752
  See application file for complete search history.

(56) References Cited

U.S. PATENT DOCUMENTS

| | | | | |
|---|---|---|---|---|
| 3,005,573 A | * | 10/1961 | Dawson | F16K 17/162 |
| | | | | 220/89.2 |
| 3,834,580 A | * | 9/1974 | Ludwig | F16K 17/1613 |
| | | | | 137/68.26 |
| 4,597,505 A | * | 7/1986 | Mozley | F16K 17/1613 |
| | | | | 137/68.21 |
| 5,005,722 A | * | 4/1991 | Short, III | F16K 17/1606 |
| | | | | 137/68.19 |
| 5,022,424 A | * | 6/1991 | Reynolds | F16K 17/162 |
| | | | | 137/68.25 |
| 5,305,775 A | * | 4/1994 | Farwell | F16K 17/1606 |
| | | | | 137/14 |
| 5,934,308 A | * | 8/1999 | Farwell | F16K 17/16 |
| | | | | 137/68.26 |
| 6,006,938 A | | 12/1999 | Mozley | |
| 6,431,383 B1 | | 8/2002 | Mozley | |
| 6,945,420 B2 | * | 9/2005 | Krebill | F16K 17/1606 |
| | | | | 220/89.2 |
| 8,517,042 B2 | | 8/2013 | Khamitkar | |
| 8,622,071 B2 | | 1/2014 | Wilson | |
| 8,807,154 B2 | | 8/2014 | Khamitkar | |
| 2012/0204969 A1 | | 8/2012 | Walker | |

* cited by examiner

*Primary Examiner* — Mary McManmon
*Assistant Examiner* — Richard K Durden
(74) *Attorney, Agent, or Firm* — Polsinelli PC

(57) ABSTRACT

An inlet support structure for use with a rupture disc, the inlet support structure including an annular member having an inner diameter, an outer diameter, a plurality of spaced apart cut-outs extending from the inner diameter towards the outer diameter, a central non-circular opening extending through the annular member and including the cut-outs, the cut-outs providing additional space for the petals of a rupture disc to be received therein when the rupture disc ruptures so as to provide a greater flow area through the rupture disc.

10 Claims, 4 Drawing Sheets

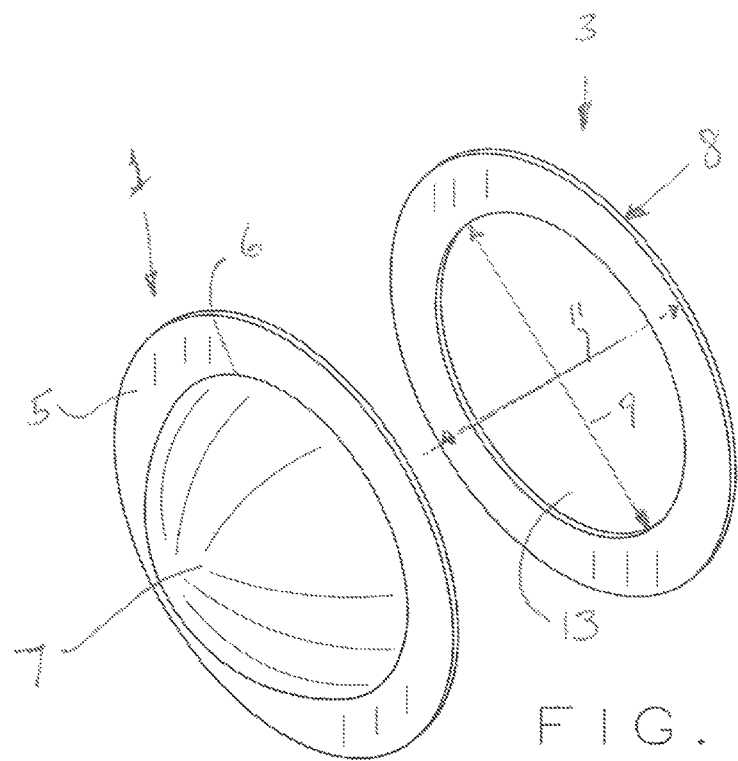
FIG. 1
PRIOR ART
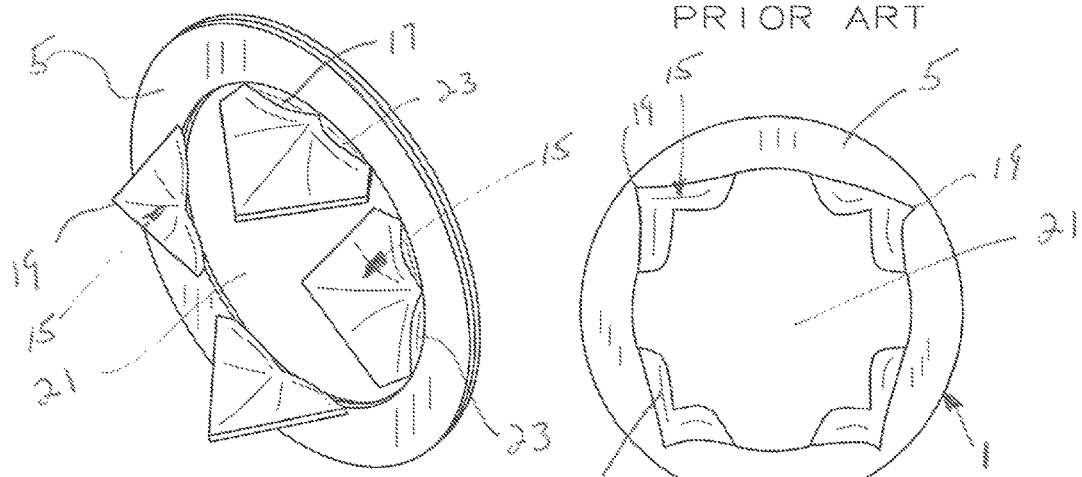
FIG. 2
PRIOR ART
FIG. 3
PRIOR ART

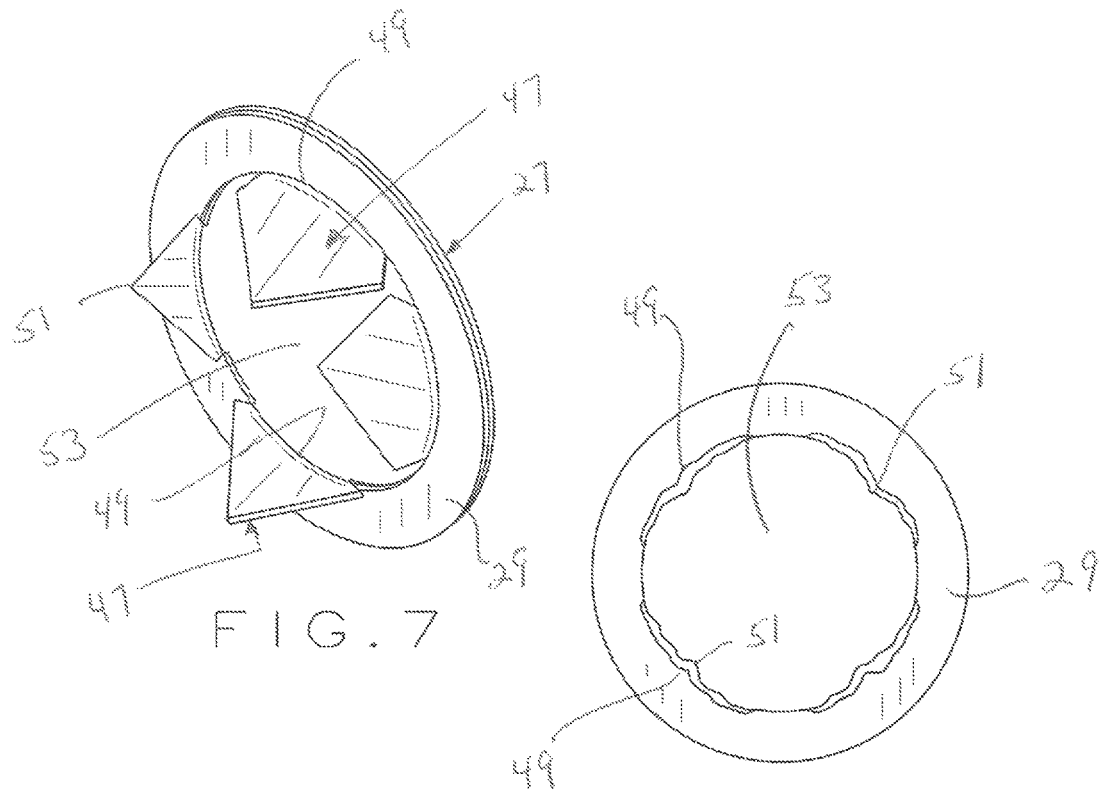
FIG. 7
FIG. 8
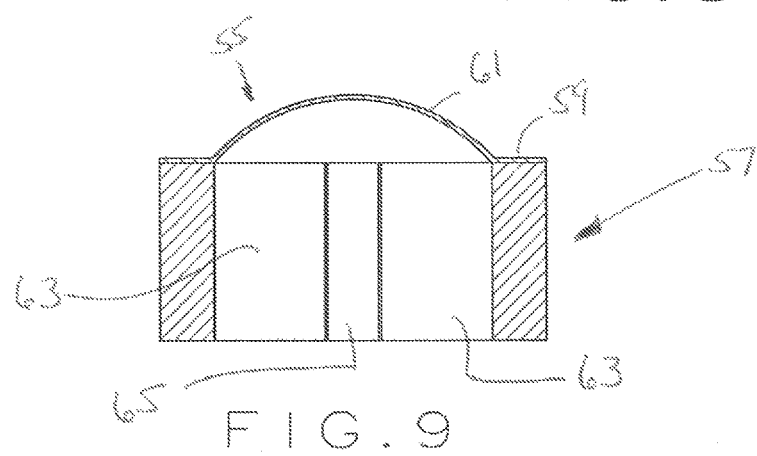
FIG. 9

INLET SUPPORT STRUCTURE FOR A TENSION ACTING RUPTURE DISC

BACKGROUND OF THE INVENTION

Devices for relieving high pressures within an over-pressurized system or vessel have been used in industry for many years. These devices, which are commonly known as rupture discs, provide a safety mechanism to relieve excess pressure from an over-pressurized system or vessel when a potentially dangerous over-pressure exists within the system. The rupture discs are typically placed within a vent or a pressure vessel of the system so as to prevent flow of fluid through the vent until an overpressure condition actually occurs. Each rupture disc is specifically designed to rupture at a pre-determined pressure and temperature thus relieving the pressure within the particular system.

Rupture discs typically include a disc dome and so called tension-type rupture discs (in contrast to so-called reverse bucking discs) are typically oriented in a particular system such that the disc dome points away from the pressure side of the vent such that pressure is applied against the concave side of the rupture disc. This means that the concave side of the disc dome faces the internal region or upstream side of the vent where pressurized fluid is likely to produce an overpressure condition. When the fluid reaches the pre-determined pressure and temperature for which the rupture disc was designed to rupture, the tensile strength of the rupture disc material is breached, and a rupture occurs.

Rupture discs are typically mounted in conjunction with at least one support structure which is positioned and located adjacent the rupture disc on the inlet or upstream side of the fluid flow entering the disc. Inlet support structures provide additional strength and rigidity to the installation configuration and such structures can be a separate member, or they can be formed integral with the rupture disc, or they can be part of an axillary component which abuts the rupture disc or is in close proximity to the rupture disc. A downstream support structure may likewise be utilized in certain situations depending upon the particular system application and the particular type of rupture disc being utilized. Both the upstream (inlet) and downstream support structures help to hold the rupture disc in place between the adjacent pipe sections.

A prior art rupture disc 1 and a conventional inlet support member 3 are illustrated in FIG. 1. Typically the rupture disc 1 is formed of a metal material which can include a number of compositions such as stainless steel, nickel, aluminum, gold, tantalum and a number of composite materials, and the support member 3 is likewise typically formed of metal, although it may also be formed from plastic or another rigid material sufficient to ensure the proper operation of the rupture disc 1. The rupture disc 1 includes an annular flat flange region 5, a transition region 6, and a disc dome 7 as would be understood by those skilled in the art. The disc dome 7, transition region 6, and the annular flat flange region 5 are preferably integrally formed. The disc dome 7 is typically semi-spherical in shape having a convex and a concave side that projects outwardly away from the annular flange 5 as illustrated in FIG. 1. The annular flat flange region 5 is typically in a circular or annular shape that surrounds the entire circumference of the disc dome 7.

Some prior art rupture disc domes such as disc dome 7 may include, for example, a deformation (not illustrated) formed at or near the geometric apex of the disc dome 7, or at other locations on the dome. These deformations are provided to weaken the integrity of the disc dome so that when pressure is applied to the dome from within an over-pressured system, it will rupture at a pressure which is lower than the rated pressure for the same rupture disc with no such deformations. These deformations may take the form of a dimple, a score line, or other weakening means so as to control the desired rupture pressure.

The prior art support member 3 includes an annular or circular flange member 8 having an inner diameter 9 and an outer diameter 11. The support member 3 is typically an annular-shaped device formed between the inner diameter 9 and the outer diameter 11 as illustrated in FIG. 1. A center aperture 13 extends through the support member 3 and is defined by the inner diameter 9. As previously explained, the support member 3 acts as a support backing or holder for helping to hold the rupture disc in proper position in a particular system and it is positioned adjacent to, and may be attached to, or even integrally formed with, the rupture disc 1. The center aperture 13 is typically designed to coincide with the inner diameter or other dimensions of the annular flat flange region 5 associated with the rupture disc 1. This means that flow area through the inlet support structure 3 will typically coincide with the flow area through the annular flange 5 of the rupture disc 1 so as not to impede or hinder the fluid flow through the rupture disc when rupture occurs. In alternative embodiments, the support member 3 may take on other shapes that complement and are compatible with an alternatively shaped rupture disc 1.

When an overpressure is detected within the vessel or chamber associated with the rupture disc 1 and the support member 3, the over-pressured fluid flows through the center aperture 13 of support member 3 and applies an outward pressure on the concave side of the disc dome 7. This fluid pressure causes the disc dome 7 to rupture at its pre-determined rupture pressure. This releases the excess pressure within the vessel or system and prevents a build-up of pressure within the system from exploding and damaging the pressure system or vessel.

FIGS. 2 and 3 illustrate the rupture disc 1 and the support member 3 after rupturing to release pressure from within the pressurized system or vessel. When the disc dome 7 ruptures, a plurality of petal-shaped fragments, or petals 15 are formed. Four petals 15 are shown in FIG. 2. The petals 15 illustrated in FIG. 2 are similar in size and shape and are symmetrically shaped. However, typically when the disc dome 7 ruptures to form the petals 15, depending on the particular pre-determined rupture pressure, the type and material used for the rupture disc, and the actual location of pressure that is applied on the disc dome 7, other shapes and sizes of petals 15 may be formed. The petals 15 themselves may be symmetrically shaped when they are formed after disc dome 7 ruptures as illustrated in FIGS. 2 and 3, but not under all circumstances. Unsymmetrically shaped petals may likewise result after rupture. Also, the presence or absence of a deformation or perforated score lines in the disc dome 7 may cause the fragments or petals 15 formed from the rupture of a disc dome to take on a different shape.

The petal fragments 15 formed after the disc dome 7 ruptures each include a base portion 17 and a tip portion 19. The base portion 17 is the portion of the petals 15 that remain attached to the annular flat flange 5 in the transition region 6 after the disc dome 7 ruptures. The base portion 17 is wider than the tip portion 19 so that the petals 15 form a triangle-like shape (though because of the rupture, that triangle is somewhat deformed) with the petals 15 narrowing from the base portion 17 to the tip portion 19.

When the disc dome 7 ruptures, a pressure relief outlet opening or aperture 21 is formed within the rupture disc 1 that extends through the support member 3. The relief outlet opening 21 provides a channel through which the over-pressured fluid may flow to relieve the pressure within its associated pressure system or vessel. The aperture 21 may take on a number of different shapes depending on the shape the fragments 15 of the disc dome 7 take on after rupturing.

When the disc dome 7 ruptures, the base portions 17 of the petals 15 are typically somewhat curved and deformed inwardly toward the center of the pressure relief aperture 21, and the tip portions 19 are typically curved and deformed outwardly away from the center of the pressure relief aperture 21. Due to the shape of the inlet support member 3 substantially overlaying the annular flange 5 of the rupture disc 1, the base portions 17 of the petals 15 are not cleanly formed when the disc dome 7 ruptures and the inner diameter edge of the aperture 13 of the support member forces the base portions 17 of the petals 15 to extend somewhat into the area defined within the pressure relief aperture 21. In addition, the base portions 17 tend to crumple or wrinkle as a result of having over pressured fluid applied thereto, and these crumpled or wrinkled portions 23 are formed at the bottom of the base portions 17 of the petals 15 and likewise extend over and into the pressure relief opening 21, all of which reduces the flow area 21 through the rupture disc as illustrated in FIGS. 2 and 3.

As excess pressure fluid flows outwardly through the pressure relief aperture 21, the crumpled sections 23 as well as base portions 17 of the petals 15 obstruct fluid flowing through the pressure relief aperture 21 and likewise cause such fluid flow to be somewhat turbulent. This also prevents the excess pressure fluid from escaping the pressure relief aperture 21 in a laminar, smooth flow, thus increasing the time it takes for the over-pressured system to release its excess pressure. In a perfect world, the maximum flow area through the pressure relief aperture 21 would be equal to the flow area through the center aperture 13 of inlet support member 3 and the flow area through the annular flange region 5 of the rupture disc 1.

It is therefore desirable to design an inlet support structure that will allow a tension acting rupture disc to rupture in such a fashion as to create a greater flow area through the rupture disc as compared to using a conventional inlet support structure as explained above.

SUMMARY OF THE PRESENT INVENTION

The present invention provides a solution to the shortcomings of the prior art inlet support structure used in conjunction with a typical tension acting rupture disc and is directed to an improved inlet support structure. The present inlet support member (also referred to as the support structure) acts as a support or holder for a tension acting rupture disc in a manner substantially similar to the prior art support member 3 discussed above. Importantly, however, the present support member includes geometrical differences that allow the rupture disc to rupture more cleanly around the transition region 5 of the disc and the center aperture of the inlet support structure as compared to existing systems. The differences in geometry cause over-pressured fluid being released from a particular vessel, chamber, or system to more quickly and easily flow through the support member and the rupture disc, and these differences provide a greater flow area through the rupture disc to more quickly relieve the pressure buildup within the system as will be hereinafter further explained.

The present support member includes an annular member having an inner diameter and an outer diameter and its overall annular shape is substantially similar in size and shape to the annular flat flange portion of the rupture disc to which it will support. Importantly, the present inlet support member also includes a plurality of cut-out portions that are cut from the inner diameter of the annular member in the direction of the outer diameter. The cut-out portions are spaced apart from one another around the inner circumference of the present support member and these cut-outs may be, but do not have to be, evenly spaced apart from one another. At the locations of the present support member that include the cut-out portions, the present support member is narrower in width. Because the cut-out portions are cut from the annular member, portions of the support member between adjacent cut-out portions remain in place. Those remaining portions form tab members which extend inwardly toward the center of the support member and have interior end portions positioned and located at a diameter equivalent to the inner diameter of the support member and equivalent to the diameter of the rupture disc dome to which it will be attached. The cut-out portions and remaining tab members result in a center aperture that is non-circular in shape and which includes the cut-out portions.

When the present inlet support member is mated with a corresponding tension acting rupture disc, the cut-out portions of the present support member will overlay the annular flange portion such as flange portion 5 of rupture disc 1 illustrated in FIG. 1. As such, these cut-out portions of the present inlet support member increase the area of the center aperture therethrough as compared to the center aperture associated with a conventional prior art support member and thus increases the area through which fluid flow can escape from an over-pressurized system. In addition, because the tab members associated with the present support member likewise extend into the center aperture a distance greater than the cut-out portions, rupture typically occurs where a tab member abuts a cut-out portion and the petals formed during rupture tend to fold back into the cut-out portions thereby causing the disc dome to rupture in a much cleaner manner and further allowing much of the petal base portion deformation and crumpling to occur within the cut-out portions of the present inlet support structure. This additional space outside of the pressure relief flow area of the rupture disc for allowing the petal fragments to be received into thereby provides for a greater flow area through the rupture disc as compared to the impeded flow area 21 associated with use of a standard conventional inlet support member as illustrated in FIG. 3. In addition, because the over pressure fluid flowing through the center aperture of the present support member applies less pressure to the disc dome at those portions above the tab members as compared to those portions above the respective cut-out portions, this results in a much cleaner rupture around the various tab portions such that the base portions of the petal fragments take on a width approximately equal to the width of the respective cut-out portions and are received therein.

In addition, because of the cut-out portions, the base portions of the petals formed after rupture do not include the crumpled portions associated with use of the prior art support member. The elimination of the crumpled portions that would otherwise have extended over and into the flow area of the pressure relief opening causes the pressure relief opening to have a substantially greater flow-through area than the pressure relief aperture formed using the prior art support member. Thus, a greater flow area is provided through the rupture disc than in the prior art structure and this allows the excess pressure to more quickly and smoothly evacuate the pressure relief opening with reduced turbulence.

The tab members associated with the present inlet support member also may help the rupture disc to resist, to a degree, any vacuum effect within a particular system. The tab members provide an upward force against the flat annular flange region of the rupture disc. This upward force helps to keep the disc dome from collapsing inwardly when backflow pressure within the system or vessel is acting in an opposite direction. Previously existing inlet support structures do not provide such a resistance to buckling caused by back pressure.

Alternative inlet support structures may be provided that are thicker or thinner depending on the particular application and the design and the shape of the rupture disc to be used. In addition, the present support structure may take on a variety of different shapes and is not limited to being annular or ring shaped so long as appropriate cut-out portions are provided for allowing the petals to rupture without substantially extending into the pressure relief flow area of the rupture disc.

Depending upon the particular application and the desired rupture disc burst pressure, it is recognized and anticipated that, in alternative support structures, any number of cut-out portions and tab members may be formed in the present support member. In those alternative embodiments, the number of petals fainted when the disc dome ruptures would generally be equal to the number of cut-out portions formed in the support structure.

BRIEF DESCRIPTION OF THE DRAWINGS

For a better understanding of the present invention, reference may be made to the accompanying drawings.

FIG. 1 is an exploded perspective view of a prior art inlet support structure and a prior art tension acting rupture disc.

FIG. 2 is a perspective view of the prior art inlet support structure and tension acting rupture disc of FIG. 1 assembled for operative use and after rupture.

FIG. 3 is a top plan view of the prior art inlet support structure and tension acting rupture disc of FIG. 2.

FIG. 7 is a perspective view of inlet support structure and tension acting rupture disc of FIGS. 4-6 after rupture.

FIG. 8 is a top plan view of the inlet support structure and tension acting rupture disc of FIGS. 4-7 after rupture.

FIG. 9 is a cross-section view of an alternative embodiment of the present inlet support structure and tension acting rupture disc, the alternative inlet support structure constructed according to the teachings of the present invention.

DETAILED DESCRIPTION OF THE INVENTION

Figure 4:
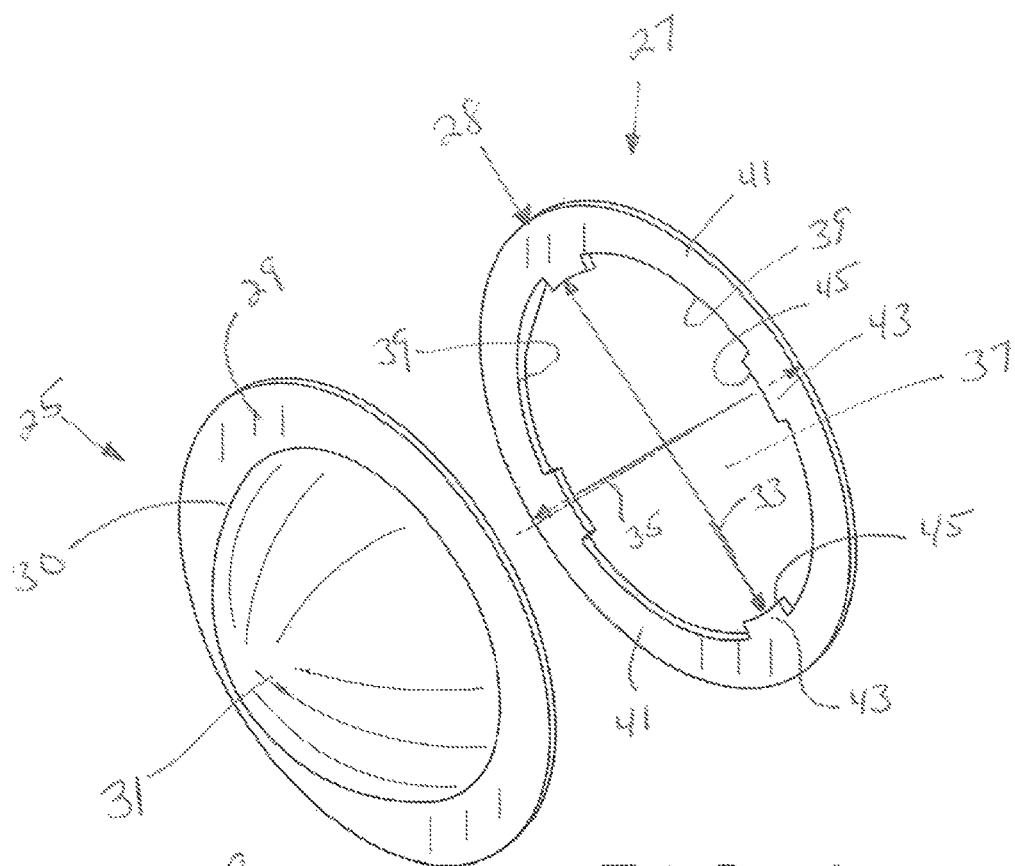
FIG. 4 is an exploded perspective view of the present inlet support structure and a prior art tension acting rupture disc, the support structure constructed according to the teachings of the present invention.

Referring to the drawings wherein like members refer to like parts, FIG. 4 illustrates one embodiment of the present inlet support structure 27 positioned for use with a prior art rupture disc 25. Rupture disc 25 is substantially similar to the prior art rupture disc 1 (FIGS. 1-3) and includes an annular flat flange region 29, a transition region 30 and a disc dome 31 that are each substantially similar to the prior art annular flat flange region 5, the transition region 6, and disc dome 7, respectively. The rupture disc 25 may likewise be provided with a deformation in the form of dimples, score lines, or other weakening elements to facilitate the rupture of the rupture disc 25. The present support member 27 is constructed according to the teachings of the present invention and again acts as a support member or holder for the rupture disc 25 in a manner substantially similar to the prior art support member 3. As will be hereinafter explained, the present support member 27 includes structural differences that allow rupture disc 25 to rupture more cleanly and to provide a greater flow area through the rupture disc for allowing the over pressured fluid to escape a pressurized system.

Figure 5:
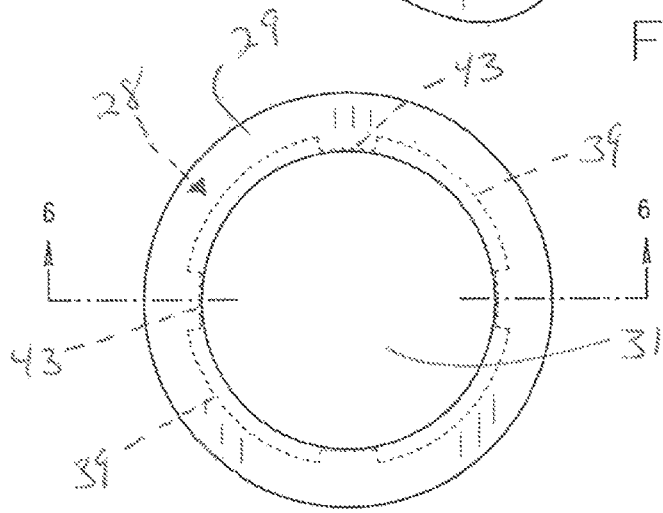
FIG. 5 is a top plan view of the inlet support structure and tension acting rupture disc of FIG. 4 assembled for operative use and prior to rupture.
Figure 6:
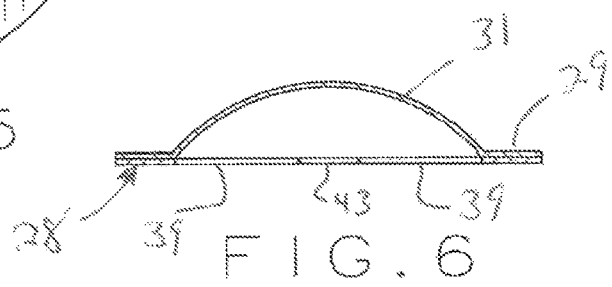
FIG. 6 is a cross-section view of the inlet support structure and tension acting rupture disc of FIG. 5 taken along line 6-6.

More particularly, as best illustrated in FIGS. 4 and 5, the present support member 27 includes an annular member 28 having an inner diameter 33, an outer diameter 35, and a center aperture 37 extending therethrough. The outer diameter 35 may be substantially similar to the outer diameter of the annular flange member 29 of rupture disc 25 and the inner diameter 33 may have dimensions substantially similar to the inner diameter of the annular flat flange region 29 as will be hereinafter further explained. The present support member 27 further includes a plurality of spaced apart cut-out portions or cut-outs 39 that are cut from the inner diameter 33 of annular member 28 towards the outer diameter 35 as best illustrated in FIGS. 4 and 5. The cut-out portions 39 are intermittently spaced apart from one another around the inner circumference of annular member 28 as illustrated. In the illustrated embodiment of FIGS. 4-8, the cut-out portions 39 are evenly spaced from one another, but in alternative embodiments, it is recognized and anticipated that the present cut-outs may vary in size and may be spaced from one another at random, intermittent distances relative to one another. Unlike the support member 3, the center aperture 37 of the present support member 25 is formed within the interior of the support member 27 between the inner diameter 33 and the outer diameter of the respective cut-out portions 39. Unlike the center aperture 13, the center aperture 37 does not have a uniformly circular shape but instead also includes the spaces formed by the cut-outs 39.

In this regard, it is to be noted that the width of the annular member 28 is narrower at the locations 41 which include the cut-out portions 39. Because the cut-out portions 39 are cut from the annular member 28, there are remaining tab portions 43 located between each respective pair of adjacent cut-out portions 39. These remaining tab portions 43 extend inwardly toward the center of the support member 27 and have terminal end portions 45 at their distal ends which are positioned and located at a diameter equivalent to the inner diameter 33 of the annular member 28. This inner diameter 33 also generally corresponds to the inner diameter of the annular flange region 29 of rupture disc 25 and to the diameter of the disc dome 31. Any greater inner diameter 33 would extend into and obscure the pressure relief flow area of the rupture disc.

As clearly illustrated in FIG. 5, when the present support member 27 is positioned in abutting relationship with the annular flange region 29 of rupture disc 25, the terminal end portions 45 of tab members 43 coincide with the inner diameter of the annular flange member 29 of the rupture disc and the cut-out portions 39 overlay portions of the same annular flange region 29 of rupture disc 25. As will be hereinafter explained, these cut-out portions 39 provide additional spaces for the disc dome 31 to rupture and fold back into the cut-outs 39 so as to form a greater flow area through the rupture disc. It is important that the cut-out portions 39 extend from the inner diameter 33 of the present annular member 28 towards the outer diameter 35 as illustrated in FIGS. 4 and 5 such that the cut-outs 39 do not extend into the pressure relief flow area of the rupture disc, but instead, overlay the annular flange region 29 of the rupture disc as clearly illustrated in FIG. 5.

FIGS. 7 and 8 illustrate the present support member 27 and the rupture disc 25 in their assembled condition and after the rupture disc dome 31 has ruptured. As previously described, the disc dome 31 ruptures when there is an overpressure in the vessel or system associated with the support member 27 and the rupture disc 25. The overpressure within the vessel or system causes the rupture disc 25 to burst and foim petal-shaped fragments, or petals 47. The petals 47, like the petals 15 of the rupture disc 1 (FIGS. 2 and 3), each include a base portion 49 and a tip portion 51. When the disc dome 31 ruptures to form the petals 47, a pressure relief opening 53 is formed through which the pressurized fluid may flow.

After a rupture, when the fluid flows through the newly-fat tied pressure relief opening 53, it first flows through the center aperture 37 of the present support structure 27. The cut-out portions 39 increase the area of the center aperture 37 as compared to the center aperture 13 of the prior art support member 3, thus increasing the area through which flow can escape the over-pressurized system. Moreover, because the tab members 43 extend over and into the center aperture 37, the pressurized fluid is steered around the tab members 43 and through the center aperture 37 and its cut-out portions 39. As a result, when the disc dome 31 ruptures, the over-pressured fluid flows through the cut-out portions 39 and applies pressure to the annular flange region 29 and its associated transition region 30 located above each cut-out portion 39 thereby forcing the base portion 49 of each petal 47 to fold back into the various cut-out portions 39, thus causing the disc dome 31 to rupture in a much cleaner manner. Typically the ruptures occur where a tab member 43 abuts a cut-out portion 39, and the base portion 49 of each petal 47 is forced into the space formed by the cut-out portions 39 and the width of each petal 47 at its base is approximately the same as the width of the respective cut-out portion 39.

In addition, because of the pressurized fluid flowing through the cut-out portions 39, the base portions 49 of the petals 47 do not include the crumpled portions 23 associated with the prior art rupture disc 1. Instead, the force of the pressurized fluid flowing through the cut-outs 39 cleanly fold the base portion 49 of each petal 47 into the respective cut-outs as shown in FIG. 8. The elimination of the crumpled portions 23 that would otherwise have extended over and into the flow area of the relief opening 53 causes the relief opening 53 to have a substantially greater flow area as compared to the pressure relief opening 21 of the prior art support structure 3. Thus, a greater flow area is provided within the rupture disc 25 than in the prior art rupture disc 1. Because the present support structure 27 and rupture disc 25 provide a greater area through which fluid may flow, the pressure relief opening 53 allows the excess pressure, which at times can be dangerously high, to more quickly and smoothly evacuate the system and flow through the pressure relief opening 53 with reduced turbulence.

The tab members 43 may also help the rupture disc 25 resist any vacuum effect within the pressurized system or vessel, to a certain degree. The tab members 43 preferably provide an upward force against the flat annular flange 29 of the rupture disc 25 when a backflow pressure within the system is pulling the disc dome 31 inwardly. This helps to keep the disc dome 31 from collapsing inwardly when a backflow pressure is acting in an opposite direction to the typical flow.

An alternative inlet support structure 57 is illustrated in FIG. 9. Like the rupture discs 1 and 25, the rupture disc 55 of FIG. 9 includes an annular flat flange 59 which extends circumferentially around a disc dome 61. The present support structure 57 illustrated in FIG. 9 is thicker than the support member 27. This thicker structure is typically due to the installation configuration associated with a particular system. Although support member 57 is thicker as compared to support member 27, its structure and function is substantially identical For example, like the support structure 27, the thicker support structure 57 includes cut-out portions 63 substantially similar to the cut-out portions 39 of the support member 27. The cut-out portions 63 are illustrated as being cut through the entire depth of the support structure 57 such that the cut-out portions 63 extend entirely therethrough. Nevertheless, the cut-outs 63 do not have to extend through the entire depth of support structure 57. Instead, cut-outs 63 need to only have a sufficient depth within support structure 57 to ensure that the relief opening such as relief opening 53 is created when the rupture disc bursts. Testing has shown that the depth of the cut-outs 63 need only be a fraction of the inlet bore diameter, that is, they need to be of sufficient depth to allow sufficient space in the inlet area of the holder to allow the petals of the rupture disc to be received therein as explained above so as not to obscure the pressure relief opening such as opening 53. Between the respective cut-out portions 63, a tab member 65 substantially similar to the tab members 43 is provided wherein the terminal end portions of the tab members 65 likewise define the inner diameter of the support structure 57. The tab members 65 also extend completely through the depth of the support structure 57 like cut-outs 63. Various alternative thicknesses of support structures associated with a particular rupture disc and with a particular pressurized system are also envisioned and anticipated. The support structures may be as thin or as thick as required based on the design and function of the rupture disc and the particular system into which it will be installed.

FIGS. 10A-10E illustrate a number of alternatively shaped support structures. The configuration shown for the support structures illustrated in FIGS. 10A-10E represent some, but not all, possible configurations of a support structure that can be used with a rupture disc in the manner described above. For example, a support structure 67 illustrated in FIG. 10A includes two cut-out portions 69 cut from an inner diameter 71 of the support structure 67. The support structure 67 includes two tab members 73 that remain between the cut-out portions 69 formed from the inner diameter 71.

Figures 10A, 10B:
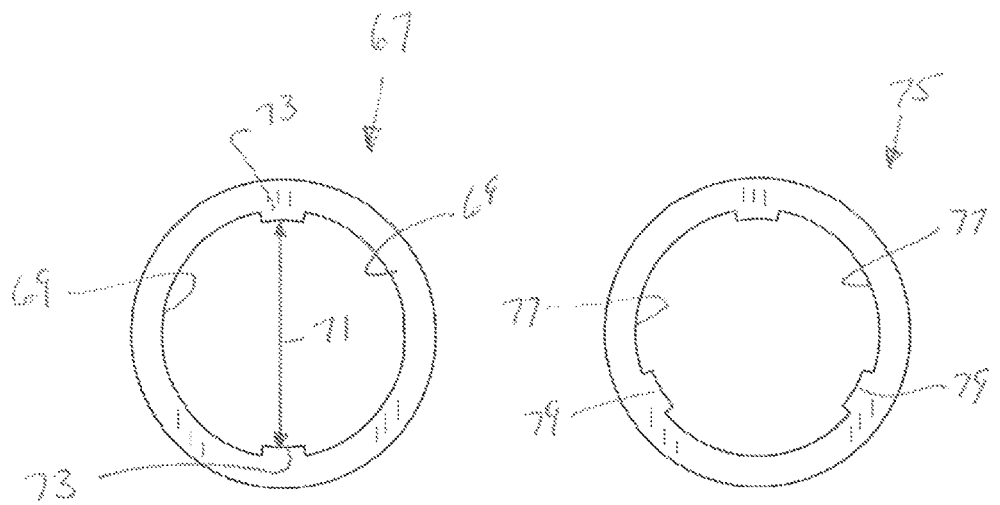
FIGS. 10A-10E are top plan views of still other various alternative embodiments of the present inlet support structure.

A support structure 75 illustrated in FIG. 10B is substantially similar to the support structure 67, except that it includes three cut-out portions 77 and thus three tab members 79.

Figures 10C, 10D:
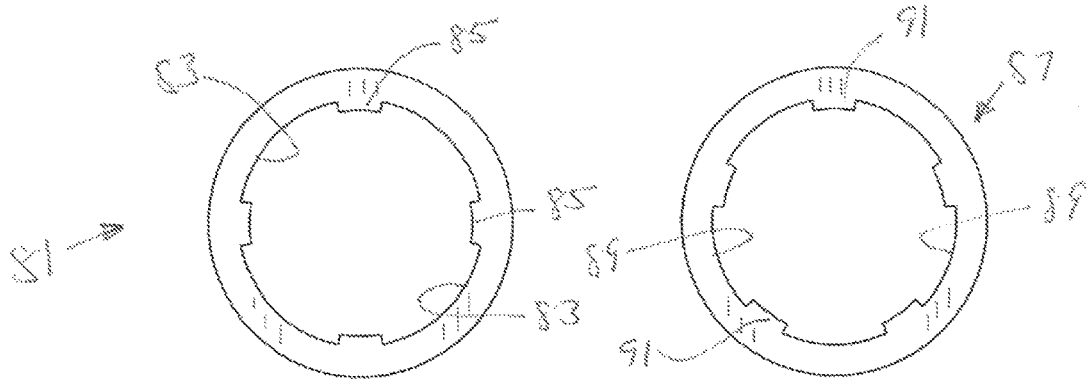

A similar alternative support structure 81 illustrated in FIG. 10C includes four cut-out portions 83 and thus four tab members 85.

FIG. 10D illustrates a support structure 87 that includes five cut-out portions 89 and thus five tab members 91.

Figure 10E:
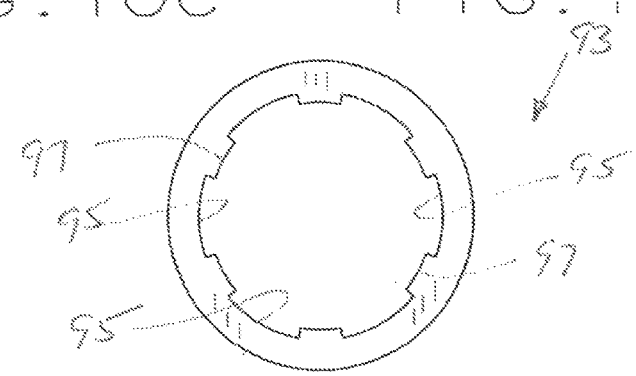

A support structure 93 illustrated in FIG. 10E includes six cut-out portions 95 and thus six tab members 97.

Many other configurations having more cut-out portions and a corresponding member of tab members are also envisioned. The number of cut-outs and tab members associated with the present inlet support structure will normally be dictated by the parameters associated with the rupture disc design required to protect a particular pressurized system into which it will be inserted as well as the particular design parameters of the vent system, the burst pressure of the rupture disc and other factors. In any particular embodiment, the ruptured petals are forced into the spaces provided by the cut-outs associated with the present inlet support structure.

Although the present inlet support members have been described in conjunction with a tension acting rupture disc, it is recognized and anticipated that the present support member would work equally as well with a reverse acting rupture disc to create a greater flow through the rupture disc.

From the foregoing, it will be seen that the various embodiments of the present invention are well adapted to attain all the objectives and advantages hereinabove set forth together with still other advantages which are obvious and which are inherent to the present structures. Since many possible embodiments of the present invention may be made without departing from the spirit and scope of the present invention, it is to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Thus, there has been shown and described several embodiments of a novel inlet support structure for use with a tension acting rupture disc and other rupture discs. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required."

Many changes, modifications, variations and other uses and applications of the present constructions will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. An apparatus comprising:
    a rupture disc including an annular flange portion having an outer diameter and an inner diameter and a dome portion, the rupture disc rupturing at a pre-determined pressure and forming petals upon rupture; and
    an inlet support structure comprising:
        an annular member having an inner diameter and an outer diameter, the annular member defining a plurality of spaced apart cut-outs extending from the inner diameter of the annular member towards the outer diameter of the annular member, and a central aperture extending therethrough from said inner diameter of the annular member and within said plurality of cut-outs, said central aperture being a non-circular area;
        wherein the inner diameter of said annular member coincides with the inner diameter of the annular flange portion of the rupture disc.

2. The apparatus of claim 1 wherein the plurality of cut-outs are evenly spaced apart from one another around the circumference of said annular member.

3. The apparatus of claim 1 wherein an outer perimeter of the annular member is circular in shape.

4. The apparatus of claim 1 including a tab member positioned and located between each respective pair of cut-outs, each tab member including a terminal end portion which defines the inner diameter of said annular member.

5. The apparatus of claim 1 wherein the outer diameter of said annular member is configured to coincide with the outer diameter of the annular flange portion of the rupture disc.

6. A system for relieving pressure from within a pressurized vessel, said system comprising:
    an inlet support structure comprising:
        an annular member having an inner diameter, an outer diameter, a plurality of spaced apart cut-outs extending from the inner diameter towards the outer diameter, and a non-circular central opening extending therethrough, said central opening including the space formed between the inner diameter of said annular member and said cut-outs; and
    a rupture disc positioned adjacent to said inlet support structure, said rupture disc comprising:
        an annular flange portion having an outer diameter and an inner diameter, and a dome portion, said annular flange portion circumferentially surrounding said dome portion;
        wherein when an overpressure is experienced in the pressurized vessel, said dome portion ruptures into a plurality of petal-shaped fragments, each of said petal-shaped fragments including a base portion located adjacent the annular flange portion of said rupture disc;
        wherein the inner diameter of said annular member coincides with the inner diameter of the annular flange portion of the rupture disc.

7. The system of claim 6 wherein said plurality of cut-outs are evenly spaced apart from one another around the circumference of the annular member of the inlet support structure.

8. The system of claim 6 wherein said rupture disc is a tension acting rupture disc.

9. The system of claim 6 including a tab member positioned and located between each respective pair of cut-outs, each tab member including a terminal end portion which defines the inner diameter of the annular member of the inlet support structure.

10. The system of claim 6 wherein the annular member, of the inlet support structure, is circular in shape.

* * * * *